United States Patent [19]

Petro et al.

[11] 4,117,299

[45] Sep. 26, 1978

[54] METHOD OF TIPPING REFRACTORY METAL TUBULATION

[75] Inventors: John Petro, Belleville; Charles R. Schofield, Bloomfield, both of N.J.

[73] Assignee: Westinghouse Electric Corp., Pittsburgh, Pa.

[21] Appl. No.: 769,600

[22] Filed: Feb. 17, 1977

[51] Int. Cl.[2] .................................... B23K 11/00
[52] U.S. Cl. ........................ 219/117.1; 219/91.23; 219/149; 228/60; 228/173 F
[58] Field of Search ............ 219/68, 117 R, 149, 219/151, 152, 117.1, 91.23; 228/60, 137, 173 A-173 F

[56] References Cited

U.S. PATENT DOCUMENTS

| | | | |
|---|---|---|---|
| 3,415,977 | 12/1968 | Bush | 219/149 |
| 3,444,348 | 5/1969 | Goodman | 219/117 R |
| 3,566,067 | 2/1971 | Larson | 219/68 |

*Primary Examiner*—E. A. Goldberg
*Attorney, Agent, or Firm*—B. R. Studebaker

[57] ABSTRACT

An improved method for sealing off the refractory metal exhaust tubulation of the ceramic arc tube employed in the high pressure sodium discharge lamp. The method involves a single four-directional crimp of the tubulation to form an X-shaped cross-section and the subsequent electrical resistance tip-off of the tubulation while it is disposed in an inert gas atmosphere at a pressure which is higher than the pressure of the rare gas atmosphere within the arc tube and tubulation and is also above atmospheric to insure all oxygen is flushed from the area of the melting.

4 Claims, 5 Drawing Figures

METHOD OF TIPPING REFRACTORY METAL TUBULATION

BACKGROUND OF THE INVENTION

The process of this invention is an improvement in the process disclosed and claimed in U.S. Pat. No. 3,566,067 issued Feb. 23, 1971 to Daniel A. Larson for "Method Of Sealing Off Refractory Metal Tubulation By Tube-In-Circuit Electric Heating".

U.S. Pat. No. 3,566,067 discloses a process which involves a two-step compressing operation wherein the tubulation is first flattened with a pair of flattening jaws followed by a second press employing curved jaws which reduces the thickness of the press to approximately the wall thickness of the tubulation and thereby provide a high resistance section for the subsequent passing of electric current through the tubulation to cause the tubulation to separate at the center of the press and provide a seal at the end thereof. Although this method of sealing off the refractory metal exhaust tubulation of a ceramic arc tube employed in a high pressure discharge lamp has proved reasonably successful, in some instances because of the very thin section of tubulation at the point of separation and the current levels necessary to cause the melting and separation, some of the metal in this thin area is flashed away resulting, in some instances, in unreliable seals.

In addition to the foregoing deficiency of the prior art process, reduction of processing steps is a further goal in the high speed manufacturing of all types of lamps. Elimination of one of the pressing steps would therefore be a further desirable improvement. Additionally, the process as previously practiced required the entire arc tube to be disposed in an inert gas atmosphere during the processing of the arc tube and as such, is a piece work operation which cannot be performed on automated indexing equipment.

SUMMARY OF THE INVENTION

The foregoing deficiencies in the prior art process have been obviated by the present invention by providing a method for sealing off refractory metal exhaust tubulation of a ceramic arc tube which involves the simultaneous crimping of the tubulation at four equidistantly spaced points about its circumference thereby collapsing the tubulation in the crimp area; disposing only the tubulation in an enclosed area which has flowing therethrough an inert gas at a pressure which is above atmospheric and also in excess of the pressure of the gas within the tubulation; contacting the tubulation with a pair of electrical contacts at spaced locations approximately equidistant on each side of the crimp area; and passing a predetermined electrical current between the contacts through the tubulation to thereby cause the tubulation to separate at approximately the midpoint of the crimp to form a seal at the separated ends.

The radial crimping of the tubulation of this invention from four directions produces a tubulation which is essentially X-shaped in cross-section and the inert gas flowing through the enclosed area is preferably argon.

As will be apparent as the description of the process of this invention proceeds, only a single pressing or crimping operation is involved and only the tubulation is disposed in the enclosed chamber containing the inert atmosphere. Accordingly, the operation is susceptible to automated indexing equipment and an improved seal is provided.

BRIEF DESCRIPTION OF THE DRAWING

Many of the attendant advantages of the present invention will become more readily apparent and better understood as the following detailed description is considered in connection with the accompanying drawing in which.

DESCRIPTION OF THE PREFERRED EMBODIMENT

Figure 1:
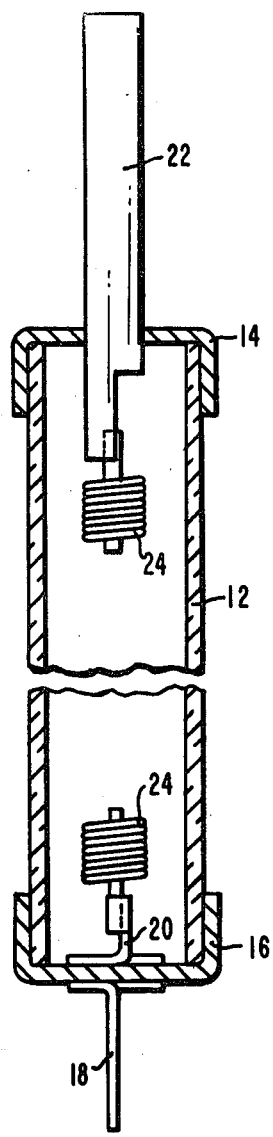
FIG. 1 is a sectional view of a ceramic arc tube illustrating the tubulation prior to tip-off.

Referring now in detail to the drawing wherein like reference characters represent like parts throughout the several views, there is illustrated in FIG. 1 a typical ceramic arc tube for a high pressure sodium discharge lamp. The arc tube generally includes a tubular ceramic body member 12 constructed from either high density polycrystalline alumina or sapphire closed off at each end by refractory metal end caps 14, 16, which are generally either niobium or tantalum. At one end of the arc tube there is generally a lead-in conductor 18 welded to the outside of the end cap and an electrode holder 20 welded to the inner surface of the end cap and at the other end of the lamp the end cap 14 generally has extending therethrough a refractory metal exhaust tubulation 22 which is brazed to the end cap. At the inner end of the tubulation 22 and on the electrode holder 20 are generally mounted opposed discharge sustaining, coiled tungsten electrodes 24. The mounting of the electrode 24 to the tubulation 22 is disclosed in detail in the U.S. Pat. No. 3,882,344 and the mounting of the electrode 24 to the electrode holder 20 as well as the electrode holder's construction is described in detail in the U.S. Pat. No. 3,872,341. The brazing of the tubulation 22 to the end cap 14 may be accomplished in accordance with either U.S. Pat. No. 3,584,372 or U.S. Pat. No. 3,636,297.

Figure 2:
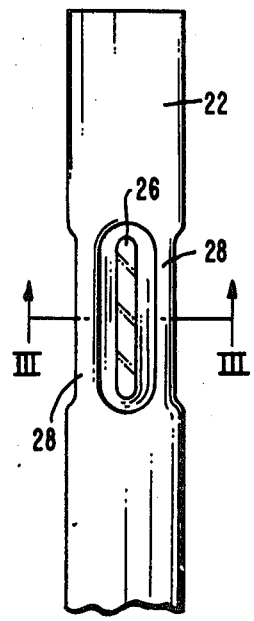
FIG. 2 is an enlarged side elevational view of the tubulation of FIG. 1 after having been crimped in accordance with this invention.
Figure 3:
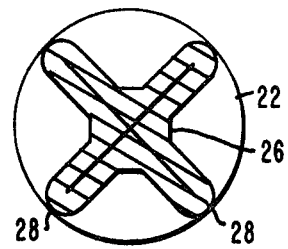
FIG. 3 is a sectional view taken along the line III—III of FIG. 2.
Figure 5:
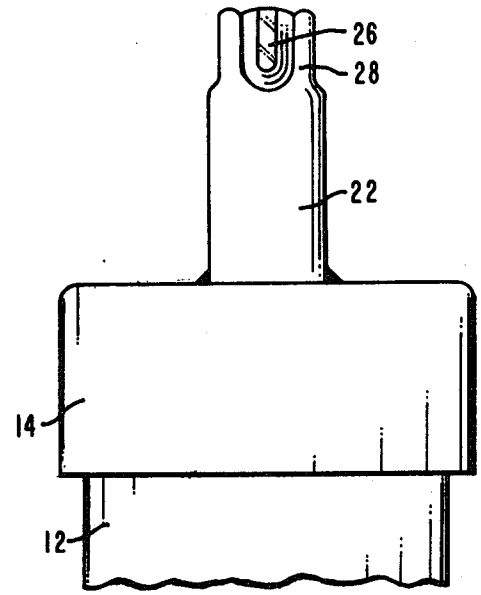
FIG. 5 is a side elevational view of a portion of a ceramic arc tube after sealing of the tubulation.

The method of this invention relates to the tipping off or closing of the tubulation 22 after the discharge lamp has been evacuated and has received its discharge sustaining fill which generally comprises a rare gas, such as xenon, at a pressure of 20 to 30 millimeters and a sodium-mercury amalgam. The tipping off or sealing of the tubulation 22 was previously performed in accordance with the process disclosed and claimed in U.S. Pat. No. 3,566,067, issued Feb. 23, 1971 to Daniel A. Larsen. This process required that the lamps be individually processed by hand and required a two-step pressing operation prior to passing the electric current through the tubulation to accomplish the seal. As best illustrated in FIGS. 2 and 3, the process of this invention involves a single crimping step in which the tubulation is crimped simultaneously at four equidistantly spaced points about its circumference, thereby collapsing the tubulation in the area of the crimp to form an X-shape in cross-section, as illustrated in FIG. 3. This crimp is preferably accomplished with a modified form of a Buchanan model No. 11484 tool, manufactured by the Buchanan Electric Products Corporation of Union, N.J. This crimping operation completely collapses the tubulation as illustrated by the depressions 26 and the wings or points 28.

Figure 4:
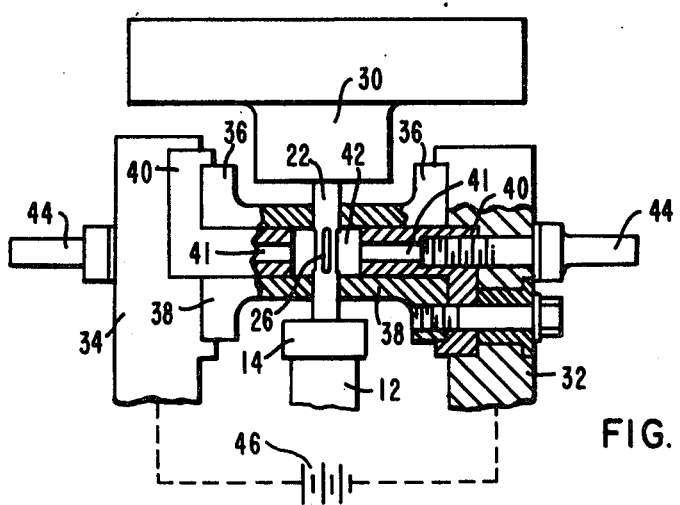
FIG. 4 is a side elevational view partly in section of equipment capable of performing this invention.

In practice, during the automated processing of the ceramic arc tube, the arc tube is carried by an exhaust head 30 which travels from work station to work station and after it has been exhausted and filled with the discharge sustaining filling of xenon and sodium-mercury amalgam, the exhaust head 30 is indexed to the crimping station where the crimp illustrated in FIGS. 2 and 3 occurs. At the next position, the exhaust head 30 is indexed into the tip-off jaws illustrated in FIG. 4, which close about the tubulation in a simple, mechanical manner. The tip-off jaws include a pair of jaw carrying members 32 and 34 which have mounted thereon upper contact members 36 and lower contact members 38. The contact members 36 and 38 mounted respectively to members 32 and 34 are separated by an insulating member 40 which has a passage 41 therethrough which communicates with an enclosed area 42 surrounding the crimp in the tubulation and the inert gas connectors 44. The power supply 46 is connected between the members 32 and 34 to provide a path for the current through member 34, left-hand closure jaw 38, the tubulation, right-hand closure jaw 36 and member 32. As will be seen from FIG. 4, lower jaw 38 on member 32 is insulated therefrom by the insulator 40 as is upper jaw 36 on member 34, thus providing for the electrical path above described.

In practice, the electrical resistance tip-off of the crimp is accomplished in an inert gas atmosphere, preferably argon, which flows through the left-hand gas connector 44, left-hand insulator 40, through the enclosed area 42 surrounding the crimp and proceeds out through right-hand insulator 40 and right-hand gas connector 44. It has been found that the tip-off can be performed with a current of about 400 amps at $1\frac{1}{2}$-$1\frac{3}{4}$ volts from the power supply 46. This power application is just enough to bring the niobium tubing half-way between the jaws to the melting point producing a nonviolent parting. For this reason, it is preferable that the midpoint of the crimp is spaced equidistantly from the jaws 36 and 38 since the area of highest electrical heating will be spaced the greatest possible distance from the jaws 36 and 38 which form heat sinks and permit maximum heating to occur at the midpoint therebetween. When this maximum heating at the midpoint occurs, the molten niobium or tantalum tubulation will collapse and be drawn back into the tubulation since the pressure of the argon flowing through the enclosure is greater than the pressure within the tubulation, thus providing a shiny, solid metal seal which is able to withstand the elevated pressures and temperatures at which the ceramic arc tube operates in a sodium discharge lamp. The bulkier crimp provided by this process eliminates the very thin tip sections of the prior art processes which have a tendency to fail after long hours of lamp operation.

What is claimed is:

1. A method for sealing off the refractory metal exhaust tubulation of a ceramic arc tube containing a rare gas at less than atmospheric pressure comprising the steps of:

simultaneously crimping the tubulation at four equidistantly spaced points about its circumference thereby collapsing said tubulation in said crimp area;

disposing only said tubulation in an enclosed area;

flowing an inert gas at a pressure in excess of the pressure of said rare gas within said tubulation through said enclosed area;

contacting said tubulation with a pair of electrical contacts at spaced locations approximately equidistant on each side of said crimp; and passing a predetermined electrical current between said contacts through said tubulation to thereby cause said tubulation to separate at approximately the midpoint of said crimp to form a seal at the separated ends.

2. A method of sealing off the refractory metal exhaust tubulation of a ceramic arc tube according to claim 1 wherein said inert gas flowing through said enclosed area is argon.

3. A method for sealing off the refractory metal exhaust tubulation of a ceramic arc tube containing a rare gas at less than atmospheric pressure comprising the steps of:

radially crimping said tubulation in four directions to form an X-shape in cross-section;

disposing said crimped portion of said tubulation in an enclosed area with portions of said enclosed area forming electrical contacts, said electrical contacts contacting said tubulation at points equidistantly spaced on each side of said crimp;

flowing an inert gas, at a pressure in excess of the pressure of said rare gas within said tubulation, through said enclosed arc; and passing a predetermined electrical current between said contacts through said tubulation to thereby cause said tubulation to separate at approximately said crimp thereby forming an X-shaped seal at the end of each piece of said tubulation.

4. The method of sealing off the refractory metal exhaust tubulation of a ceramic arc tube according to claim 3 wherein said inert gas is argon.

* * * * *